UNITED STATES PATENT OFFICE 2,288,351

WAX EMULSION

Richard Griffith, Red Bank, N. J., assignor to National Oil Products Company, Harrison, N. J., a corporation of New Jersey No Drawing. Application December 16, 1938, Serial No. 246,121

1 Claim. (Cl. 252—311.5)

This invention relates to a novel composition of matter and in particular to improved emulsions of the wax type which finds particular application as a coating composition for fresh fruits and vegetables and a new method for producing said emulsions.

The novel composition also finds application as a floor, leather and/or furniture polish. Another feature of the invention resides in the novel method for preparing an aqueous emulsion of the wax type.

Heretofore it has been proposed to coat fruits and vegetables with aqueous emulsions of the wax type. These emulsions generally include a hard wax, such as carnauba wax and paraffin or resin, together with the oleate or stearate of triethylamine. These emulsions, according to the proponent thereof, all have surface tensions above 33 dynes per centimeter. An emulsion of the above type is not found entirely satisfactory and consequently the following invention has been made to provide an improved emulsion of the wax type, which has greater stability and better wetting out characteristics, tougher and less brittle characteristics when dry so that it is not so easily scored or fractured, a surface tension below 33 dynes per centimeter and is adapted to be applied as a very thin film which dries in a protective layer free from checking while enhancing the lustre of the coated product.

A general object of my invention is to provide an improved emulsion of the wax type.

Another object of my invention is to provide a novel composition of matter of the wax emulsion type which may be easily and economically produced, which has high wetting out and stability characteristics and which dries out in the form of a lustrous and relatively tough and somewhat resilient film which will not normally check or peel.

Still another object of my invention is to provide a coating composition of the wax emulsion type for fruits or vegetables, which is stable, may be readily applied thereto to completely coat the same, will dry out as a thin and tough protective layer substantially free from checks and cracks and enhances the lustre thereof.

A still further object of my invention is to provide improved process for preparing an emulsion of the wax type.

According to the invention, the improved emulsion of the wax type may be produced by employing the combination of a hard wax, such as carnauba wax, candelilla wax or the like, together with an appropriate quantity of a plasticizer. This plasticizer employed is preferably a soft wax whose melting point is materially below that of the hard wax and preferably a paraffin wax whose melting point is about 140° F. The ratio of the quantity of said hard wax to the lower melting point wax may be approximately 3–1 by weight.

In carrying out the process, one of the features of the invention resides in the process which comprises heating together the admixture of the hard wax and the soft wax in a vessel until they are both fused. The fused mixture is stirred until these waxes are completely and thoroughly admixed with each other to become a homogeneous mass which is in a plasticized state. An emulsifying agent for said combination of waxes is prepared. This agent may be a soap of an organic amine. The organic amine employed as one of the constituents of said soap may be one or more of the following: the alkylol amines, such as mono, di and triethanolamine. The acid radicle of said soap is derived from one or more of the high unsaturated fatty acids having at least and preferably more than 10 carbon atoms and more than one double bond per molecule, such as linoleic and linolenic acids or their mixtures, and preferably linseed fatty acids which are principally mixtures of linoleic and linolenic acids and are commercially available at a reasonable cost. The appropriate fatty acid is reacted with the desired organic amine to form the soap, and the soap is then added to the molten waxes and stirred to thoroughly admix and uniformly distribute the constituents with respect to each other to provide a homogeneous mass of waxes and soap. This homogeneous mass is maintained in molten condition and either water or a water solution of soaps whose temperature is close to the boiling point, and at 200° F. is added to said mass in relatively small increments.

In the course of adding the aqueous soap solution, it will be observed that as the first few increments thereof are added, the mass will be clear after stirring and is at this stage a water-in-oil emulsion. Upon subsequent additions of aqueous soap solution, the emulsion inverts to an oil-in-water emulsion. As the mass begins to invert, it becomes opalescent, cloudy and then jelly-like. As still more aqueous soap solution is added, the viscosity gradually decreases until the last increment of water is added and the creamy emulsion is obtained. After each water addition, the entire mass is stirred to rid the same completely of any lumpy formations. The temperature of the mass throughout the entire water additions should be maintained at least as high as 210° F. After the last increment of water has been added and the mass has been stirred for a sufficient length of time, the resultant aqueous emulsion free from any lumps, will be a smooth and creamy semi-solid substantially free from wax soap which would otherwise be present if an aqueous solution of the amine were added to a molten mixture of the wax and fatty acids. The emulsion is then allowed to cool. It is now ready to be used to polish leather, floors or furniture in the manner generally employed for polishing of these objects; and may be employed as a coating composition for fruits and vegetables by dipping the same therein, by spraying or by using any other desired method.

For a fuller understanding of the nature and objects of the invention, reference should be had to the following examples which are given merely to illustrate further the invention and are not to be construed in a limiting sense, all parts herein being given by weight:

Example I

Completely melt a mixture of 15 parts of carnauba wax and 5 parts of paraffin wax (melting point about 140° F.) and stir until completely homogeneous throughout. Saponify 4.13 parts of linseed fatty acids (acid value 190–195) with 1.87 parts of triethanolamine, add the soap thus obtained to the molten wax mass and stir until completely homogeneous throughout. Make up an aqueous soap solution consisting of 74 parts of water and between 1 to 2 parts of anhydrous, glycerine free soap consisting of the sodium soaps of rice bran oil and cocoanut oil in the proportions of approximately 3 to 1. This aqueous soap solution at 200° F. is intermittently added in 20 equal increments to the wax-soap mass which is continuously stirred and maintained at a temperature of at least 210° F. After each increment of the aqueous soap solution is added, the entire mass is continuously stirred to break up any lumps which may have formed therein and until the mass is smooth. The mass is smooth before each succeeding increment of the aqueous soap solution is added. After the last increment of aqueous soap solution is added and the mass is further stirred, the resultant emulsion will be smooth, creamy and stable and has a surface tension at 20° C. of 30.0 to 30.5 dynes per centimeter. This concentrated emulsion is preferably diluted with sufficient water so that the percent of solids therein amounts to 4% of the emulsion. This emulsion has a surface tension of 29.5 to 30.0 dynes per centimeter. The so diluted emulsion has excellent wetting out and spreading characteristics and dries out as a thin protective layer which is tough, somewhat resilient, free from checks and cracks.

Example II

Completely melt a mixture of 15 parts of carnauba wax and 5 parts of paraffin wax (melting point about 140° F.) and stir until completely homogeneous throughout. Saponify 4.65 parts of linseed fatty acids (acid value about 187) with 1.35 parts of morpholine, add to the molten wax mass and stir until completely homogeneous throughout. 75 parts of water at a temperature of 200° F. is intermittently added in 20 equal increments to the mass which is continuously stirred and maintained at 210° F. after each water addition to break up any lumps which may have formed therein and until the mass is smooth. The mass is smooth before each succeeding increment of water is added. After the last increment of water is added, the mass is smooth, creamy and stable. This concentrated emulsion is preferably diluted with sufficient water so that the percentages of solids therein amounts to 4% to 6% of the emulsion. This emulsion has a surface tension between 31 to 32 dynes per centimeter at 20° C. If desired there may also be incorporated in said emulsion 1 to 2 parts of the sodium soaps of rice bran oil and cocoanut oil in the proportion of approximately 3 to 1. It is preferable not to add these sodium soaps directly to said concentrated emulsion. The water to be added to the concentrated emulsion is divided into two equal parts. One part of said water is added directly to the concentrated emulsion and the mass is stirred until homogeneity is attained. The 1 to 2 parts of said sodium soaps is dissolved in said other part of water and this formed aqueous soap solution is added to the diluted emulsion to further dilute the same, so that the concentration of solids therein is 4% to 6% the emulsion.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claim is intended to cover all the generic and specific features of the invention herein described and all statements of the scope of the invention, which as a matter of language might be said to fall therebetween; and that they are intended to be inclusive in scope and not exclusive, in that if desired other materials may be added to my novel composition of matter herein claimed without departing from the spirit of the invention. Particularly it is to be understood that in said claim, ingredients or components recited in the singular are intended to include compatible mixtures of said ingredients wherever the sense permits.

Having described my invention, what I claim as new and desire to secure by Letters Patent is:

A process for producing an aqueous wax emulsion, which comprises mixing, melting and stirring a hard vegetable wax with a low melting point paraffin wax in the weight ratio of approximately 3 parts of vegetable wax to one part of paraffin wax to form a homogeneous molten mass; mixing into the molten mass a substantially anhydrous preprepared organic amine soap of a higher unsaturated fatty acid containing at least 10 carbon atoms and two double bonds per molecule to form a homogeneous mass; mixing small increments of water at a temperature of about 200° F. into the mass while maintaining the same at a temperature of at least 210° F.; and stirring the mass after the addition of each increment to effect homogeneity, the total amount of water added being sufficient to produce an emulsion of the desired consistency.

RICHARD GRIFFITH.